United States Patent

Wu

[11] Patent Number: 5,965,822
[45] Date of Patent: Oct. 12, 1999

[54] CALIBRATION FEATURE FOR A PRESSURE GAUGE

[76] Inventor: Min Wu, 1219 Brandy Buck Way, San Jose, Calif. 95121

[21] Appl. No.: 09/083,208

[22] Filed: May 21, 1998

Related U.S. Application Data

[60] Provisional application No. 60/082,734, Apr. 22, 1998.
[51] Int. Cl.⁶ ..................................................... G01L 7/16
[52] U.S. Cl. ............................................. 73/744; 73/146.8
[58] Field of Search ............................. 73/744, 745, 746, 73/146.8

[56] References Cited

U.S. PATENT DOCUMENTS

| | | |
|---|---|---|
| 3,068,703 | 12/1962 | Morton . |
| 3,789,669 | 2/1974 | Passman ..................................... 73/744 |
| 3,975,959 | 8/1976 | Larkin ........................................ 73/744 |
| 3,999,431 | 12/1976 | Makarainen . |
| 4,155,261 | 5/1979 | Hesse et al. . |
| 4,517,848 | 5/1985 | Faure . |
| 4,686,855 | 8/1987 | Smith . |
| 4,755,638 | 7/1988 | Geberth, Jr. . |
| 4,768,460 | 9/1988 | Soon-Fu . |
| 5,113,695 | 5/1992 | Huang . |

OTHER PUBLICATIONS

5 Page Computerized Patent Search by William Fry Dated Feb. 17, 1998.

Primary Examiner—Joseph L. Felber
Attorney, Agent, or Firm—Robert O. Guillot

[57] ABSTRACT

The pressure gauge is designed for operative engagement with a fluid pressurized system such as a gas or a liquid. It includes a housing having a pressurized fluid inlet orifice and a cylindrical bore formed within the housing. A pressure reactive piston is slidably engaged within the cylindrical bore, and a resistance means is disposed within the cylinder to provide a resistive force to the movement of the piston. A calibration means engages the resistance means to apply a user selectable calibration force to the piston, and a calibration means engagement means is utilized to fixedly engage the calibration means in the user selectable position. An arm member is disposed proximate the piston, whereby movement of the piston will cause movement of the arm member, and a pressure indicator means is engaged to the arm to provide an indication of the pressure level of the fluid.

10 Claims, 2 Drawing Sheets

2

CALIBRATION FEATURE FOR A PRESSURE GAUGE

CROSS-REFERENCE TO RELATED APPLICATION

This application claims priority to U.S. Provisional Application Ser. No. 60/082,734 filed Apr. 22, 1998 by Min Wu, entitled "Improved Pressure Gauge."

BACKGROUND OF THE INVENTION

1. Field of the Invention

The present invention relates generally to pressure gauges and more particularly to an improved pressure gauge including a movable piston pressure sensing element and a gauge calibration element.

2. Description of the Prior Art

The most commonly used dial pressure gauge is the Bourdon-Tube gauge. It includes a flattened tube made of resilient bronze or steel that is bent generally into a curved shape that is typically an arcuate section of a circle. One end of the flattened tube is engaged to the pressure inlet of the gauge. When fluid pressure is applied to the gauge inlet, the arcuate flattened tube tends to straighten out, and the distal end of the tube moves proportionally to the pressure difference between the inside and outside of the tube. The distal end of the tube is engaged to a pressure scale pointer through a pinion and spur tooth gear. A spring is engaged to the pinion to provide a reactive force. The Bourden-Tube gauge must be properly calibrated to ensure accuracy, and it can be costly and time consuming to accurate calibrate a Bourden-type gauge with its various mechanisms.

One embodiment of the present invention is designed to be similar in size and shape to the Bourden-type gauge, to act as a replacement for it. The present invention generally utilizes a piston-type pressure element having a coil spring to provide a reactive force. Gauges of this general configuration are known in the prior art, and they too need to be calibrated. The present invention utilizes a threaded calibration nut that is fixedly engaged following calibration to produce accurate results.

SUMMARY OF THE INVENTION

The pressure gauge is designed for operative engagement with a fluid pressurized system such as a gas or a liquid. It includes a housing having a pressurized fluid inlet orifice and a cylindrical bore formed within the housing. A pressure reactive piston is slidably engaged within the cylindrical bore, and a resistance means is disposed within the cylinder to provide a resistive force to the movement of the piston. A calibration means engages the resistance means to apply a user selectable calibration force to the piston, and a calibration means engagement means is utilized to fixedly engage the calibration means in the user selectable position. An arm member is disposed proximate the piston, whereby movement of the piston will cause movement of the arm member, and a pressure indicator means is engaged to the arm to provide an indication of the pressure level of the fluid.

It is an advantage of the present invention that it provides a dial pressure gauge that is relatively easy to manufacture.

It is another advantage of the present invention that it provides a pressure gauge that is easy to calibrate.

It is a further advantage of the present invention that it provides a pressure gauge that can be calibrated to a high degree of accuracy.

It is yet another advantage of the present invention that it provides a manufacturing method for creating and calibrating a plurality of coil spring pressure gauges, each of which is easily calibrated to provide accurate results.

It is still another advantage of the present invention that it provides a piston-type pressure element having a lip type O-ring seal to prevent pressurized fluid leakage yet allow free movement of the piston.

It is still a further advantage of the present invention that provides a calibration mechanism that is fixedly engaged following calibration, such that the device will remain calibrated throughout its lifetime.

The foregoing and other objects, features and advantages of the present invention will be apparent from the following detailed description of the preferred embodiments, which make reference to the several figures of the drawings.

IN THE DRAWINGS

DETAILED DESCRIPTION OF THE PREFERRED EMBODIMENTS

Figure 1:
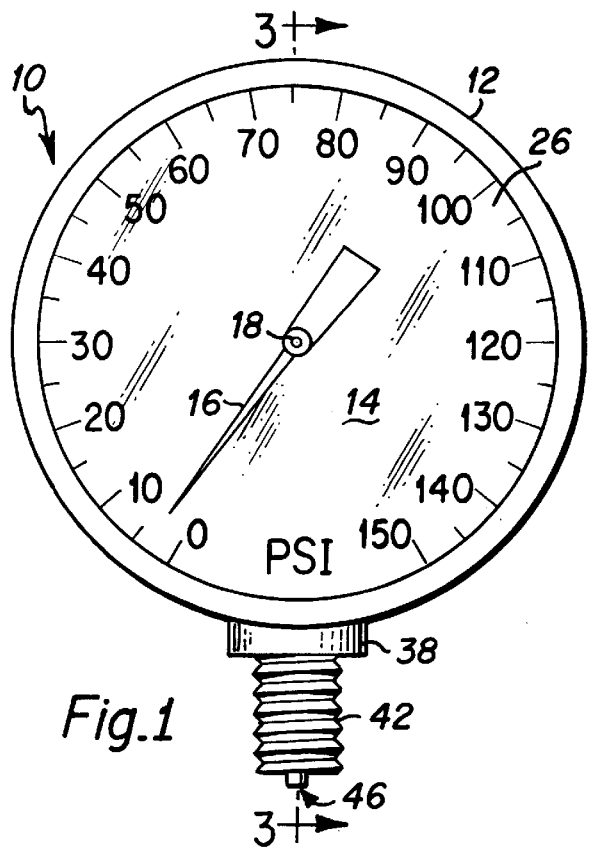
FIG. 1 is a front elevational view of a round dial type pressure gauge of the present invention.
Figure 3:
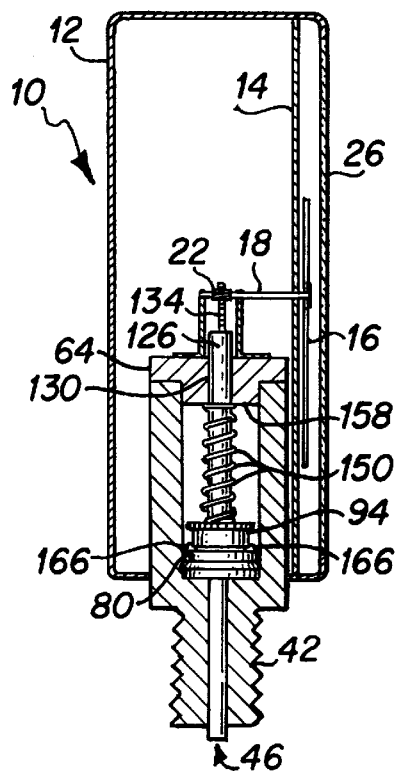
FIG. 3 is a side cross-sectional view of the gauge depicted in FIGS. 1 and 2, taken along lines 3—3 of FIG. 1.
Figure 2:
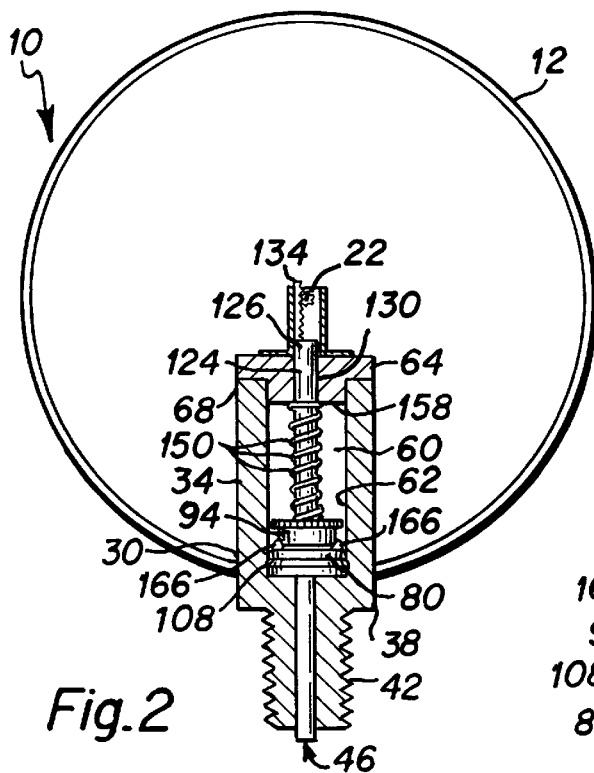
FIG. 2 is a front elevational view of the device depicted in FIG. 1 having front face portions removed to depict internal components thereof.
Figure 4:
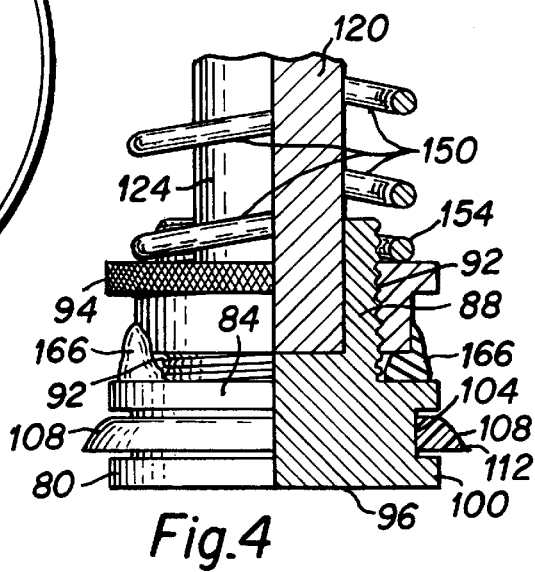
FIG. 4 is an enlarged, partially cross-sectional view of the piston element of the device depicted in FIGS. 1–3.

A dial pressure gauge embodiment of the present invention is depicted in FIGS. 1–4. As depicted in FIG. 1, the dial pressure gauge 10 includes a round casing 12, a round gauge face 14 and a pointer 16 which is rotatably mounted about the shaft 18 of a pinion gear 22. The casing 12 is generally formed from metal or strong plastic, while the front surface 26 is formed from glass or clear plastic to allow viewing of the face 14 and pointer 16. The significant components of the gauge 10 include a cylindrical housing 30 having an upper portion 34 which projects into the gauge casing 12 and a lower portion 38 which projects outwardly of the casing. The lower portion 38 includes a threaded external portion 42 for engagement with an external device (not shown) to which the gauge 10 is operatively engaged. An inlet bore 46 is formed through the lower portion 38 of the cylindrical housing 30 to inlet pressurized fluid (such as a gas or a liquid) into the gauge 10 whereby the pressure of the fluid is to be measured.

The upper portion 34 of the cylindrical housing 30 includes an enlarged cylindrical piston bore 60 having smooth sides 62 that is in pneumatic communication with the inlet bore 46. A housing cap member 64 is engaged to the inner end 68 of the cylindrical housing 34 to form a cap on the bore 60.

A movable piston is disposed within the bore 60. As is best seen with the aid of FIG. 4, the piston is a generally cylindrical member including a generally widened lower section 84 and a generally narrowed upper section 88 having external threads 92 formed thereon. An internally threaded gauge calibration nut 94 is threadably engaged to the threaded upper portion 88 of the piston 80. The calibration nut 94 is utilized to calibrate the gauge during the assembly and testing of the gauge components, as is discussed hereinbelow. The lower section 84 includes a generally flat lower face 96 and sidewalls 100 having an O-ring groove 104 formed therein. An O-ring seal 108 having an outwardly projecting lip 112 is disposed within the O-ring groove 104. It is to be understood that the O-ring seal is disposed to make a moving pressurized seal with the inner walls 62 of the housing bore 60.

The upper section 88 of the piston 80 is formed with a push rod bore 120 and a push rod 124 is fixedly engaged within the bore 120, such that the push rod 124 moves when the piston 80 moves. The upper shaft 126 of the push rod 124 projects through a push rod bore 130 that is formed through the cap 64, and the end portions 134 of the push rod 124 are formed with spur gear teeth that are intermeshed with the pinion gear 22. It is therefore to be understood that upward movement of the piston 80 will cause upward movement of the push rod 124, whereupon the upward movement of the spur gear teeth in the upper end 134 of the push rod will cause the pinion gear 22 to rotate, whereupon the gauge pointer 18 will also rotate.

A resistive force to the upward movement of the piston 80 is supplied by a coil spring 150 that is mounted within the cylinder bore 60 around the push rod 124. The lower end 154 of the coil spring 150 rests upon an outwardly projecting upper surface of the calibration nut 94, and the upper end of the coil spring 150 presses against the inner portion 158 of the cap 64. It is therefore to be understood that when the piston 80 moves upwardly, the coil spring 150 is compressed between the calibration nut 94 and the housing cap 64.

While the use of a coil spring to provide a restoring force is generally useful, because the spring's resistive force is directly proportional to the compressive force, a problem with the use of coil springs in the manufacturing of accurate instruments is that the spring constant of identically appearing coil springs can vary enough to greatly complicate quality control during manufacturing. That is, several manufactured gauges that appear to be identical in all details can report significantly different pressure readings due to the different spring constants of the different coil springs 150 disposed within the gauges. The inventor's solution to this problem is the utilization of the calibration nut during the manufacturing process to correct this problem, as is next discussed.

During the manufacturing assembly steps for each pressure gauge 10, the various specific components of a particular gauge are chosen and assembled outside of the casing 12. In this assembly process a particular coil spring 150 will have been chosen. The assembled gauge 10 is then tested to a known pressure level which is preferably, though not necessarily close to the maximum pressure gauge reading on the gauge face 14. In this test set up, the calibration nut 94 is generally initially disposed at approximately the midpoint of its threaded engagement range with the piston 80. Owing to the particular spring constant of the particular coil spring within the gauge 10, the actual reading of the gauge 10 may differ significantly from the known test pressure level. The gauge 10 is then calibrated to read the correct test pressure level by rotating the threaded calibration nut in the upward or downward direction that is required to move the piston 80, relative to the spring 150, such that the push rod 124 moves inwardly or outwardly, whereupon the pinion gear and therefore the gauge pointer is likewise moved. The calibration nut is rotated to apply a user selected calibration force on the piston 80 until the pointer of the particular pressure gauge 10 accurately reflects the known test pressure level. Thereafter, the gauge is removed from the test set up and the calibration nut is permanently engaged in its test position by an appropriate method to the inner portion 88 of the piston 80. In the preferred embodiment, the calibration nut 94 is permanently affixed by soldering it 166 in position to the piston 80, however other equivalent methods for engaging the calibration nut 94 to the piston 80 are contemplated to be within the scope of the invention. Thus, in manufacturing a plurality of pressure gauges, each including a spring 150 having a different spring constant, the use of the calibration nut and calibration process will result in a plurality of gauges that are all most accurate at the same test pressure level.

Those skilled in the art will understand that a completed, calibrated pressure gauge 10 will be most accurate at the pressure to which the gauge was calibrated and less accurate at pressure levels that are significantly different from the calibration pressure level. Thus, if it is known beforehand that a pressure gauge will be used in a situation where the greatest accuracy is required at a specific pressure, the gauge 10 can be calibrated to that specific pressure, such that its greatest accuracy will occur there. Controlled motion of the calibration nut is a significant factor in the accurate calibration of the gauge. In the preferred embodiment, the calibration nut threads 92 are preferably in the range of 32 to 64 threads per inch. Such that significant control on the vertical movement of the calibration nut is achieved.

Figure 5:
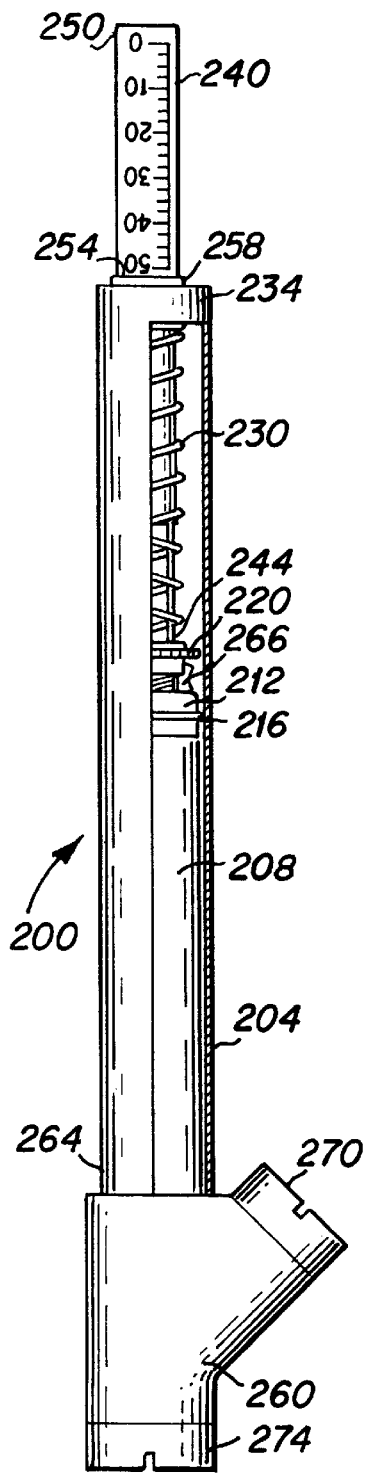
FIG. 5 is a side elevational view, with cross-sectional portions of a pencil type pressure gauge of the present invention.

An alternative embodiment 200 of the present invention comprises a pencil type pressure gauge, as depicted in FIG. 5. The gauge 200 includes a cylindrical housing 204 enclosing a cylindrical piston bore 208. A piston member 212 having an O-ring seal 216 and a calibration nut 220 is disposed within the bore 208. A coil spring 230 is disposed within the bore 208 between the calibration nut 220 and the upper end 234 of the cylindrical housing 204. The piston 212, O-ring seal 216, calibration nut 220 and coil spring 230 are substantially identical in form and function to those elements described hereabove regarding gauge 10. A push-in type plunger indicator 240 has a lower end 244 which rests upon, but is not engaged to, the piston element 212, whereas an outer, calibrated end 250 of the indicator 240 projects outwardly through opening 254 formed in the top end 234 of the housing 204. A guide 258 of the opening 254 slidably engages the indicator 240, and the lower end 244 of the indicator 240 is enlarged, such that it will not pass through the opening 254, whereby the indicator 240 is retained within the housing 204.

A single air chuck, or a dual-foot air chuck 260 is engaged to the lower end 264 of the housing 204. The dual-foot air chuck includes two air inletting members 270 and 274, each of which include a center pin element (not shown) that is utilized to depress the centrally disposed valve pin of a pneumatic automobile tire valve. It is therefore to be understood that when the gauge 200 is utilized to determine the air pressure within a pneumatic tire that pressurized air from the tire valve will pass into the piston bore 208 to push the piston 212 upwardly against the resistance of the coil spring 230, thus pushing the indicator 240 upwardly. When the gauge 200 is removed from the tire, the air pressure within the cylinder 208 will decrease to atmospheric pressure and the piston 212 will return to this nominal position. However, because the indicator 240 is not engaged to the piston, the indicator will remain at its extended position to indicate the maximum pressure which was detected by the gauge 200. The user of the device 200 must push the indicator back into the cylindrical housing 204 after having read the indicated pressure.

Calibration of the gauge 200 is conducted in a substantially identical manner to gauge 10, described hereinabove. That is, when assembling the gauge 200, the assembled components, including a particular coil spring, are tested against a known pressure level. The calibration nut 220 is rotated in its threaded engagement with the piston 212 until the pressure reading on the indicator corresponds with the test pressure level. Thereafter, the calibration nut is fixedly engaged to the piston, such as by soldering it 266 in place to the piston.

Figure 6:
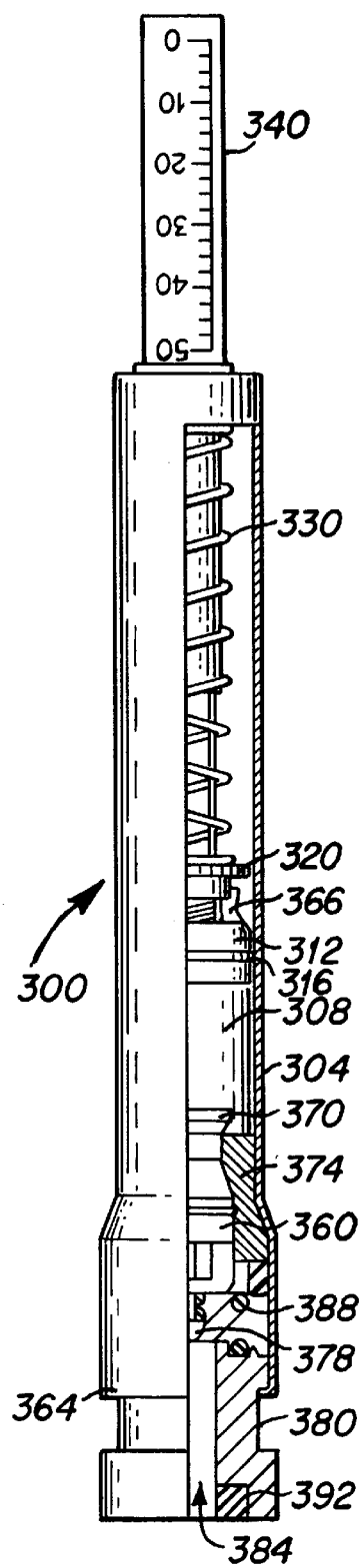
FIG. 6 is a side elevational view with cross-sectional portions of a pencil type pressure gauge having an air pressure valve disposed therewithin.

FIG. 6 depicts a further embodiment of the present invention which is similar in many respects to the gauge 200 depicted in FIG. 5. Specifically, the housing 304, bore 308, piston 312, calibration nut 320, coil spring 330 and indicator 340, are identical in form and function to those depicted and described hereabove with regard to gauge 200. As with gauge embodiments 10 and 200, the indicator 340 is engaged to the piston 312, such that it does not need to be pushed in following each usage, and the device 300 is calibrated and soldered 366 in position in the same manner as discussed hereabove with regard to gauge 200.

The significant difference between gauge 300 and gauge 200 is that gauge 300 includes a pressure valve 360 disposed within the lower end 364 of the valve housing 304. Basically, the valve 360 is substantially identical to a well known pneumatic automobile tire valve, which includes a valve core 370 that is held in place by a core support member 374 and gasket 376. A valve pin 378 projects downwardly from the valve core 370. A generally cylindrical push-on valve head 380, having an air inlet bore 384 surrounded by a gasket 392, is disposed at the lower end 364 of the housing 304. The valve head 380 is slidably engaged within the lower end 364 of the housing 304, and a small coil spring 388 serves to push the valve head downwardly.

It is therefore to be understood that when the gauge 300 is utilized on a pneumatic automobile tire that the valve head 380 depresses the center pin of the automobile tire valve to inlet pressurized air into the air inlet 384. Simultaneously, the valve head 380 depresses the valve pin 378 of the valve 360 to inlet the pressurized air into the piston bore 308. The pressurized air then causes the piston to rise, whereupon the indicator 340 accurately displays the pressure of the inletted pressurized air. When the gauge 300 is removed from the automobile tire the spring 388 causes the valve head to move outwardly, whereupon pressurized air remains trapped within the piston bore 308. To relieve the internal pressurized air, the user then must push inwardly on the valve head 380 to depress the valve pin 378, opening the valve 370 to outlet the pressurized air within the bore 308. Following the release of the pressure, the piston 312 returns to its nominal position, and the indicator 340 will move with the piston into the housing.

Figure 7:
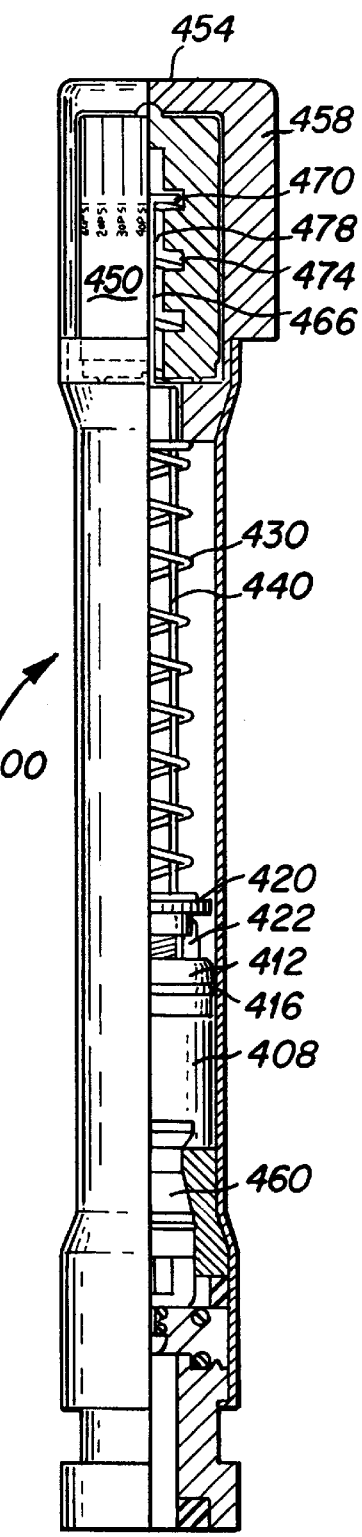
FIG. 7 is a side elevational view with cross-sectional portions of a rotary dial pressure indicator device having a valve disposed therewith.

Still another embodiment 400 of the present invention is depicted in FIG. 7. The gauge 400 is similar in many respects to the gauge 300 depicted in FIG. 6 and described hereabove. It includes an identical valve 460 disposed within a bore 408. It further includes a piston 412 having a calibration nut 420 threadably engaged and soldered 422 thereto, and a coil spring 430 which is disposed around a vertically movable rod 440. The piston 412, O-ring seal 416, calibration nut 420 and coil spring 430 are substantially identical in form and function to those elements described hereabove with regard to gauge embodiments 10, 200 and 300. The significant difference between the gauge 400 and gauge 300 is that gauge 400 includes a rotary dial pressure indicator 450 that is disposed within a clear plastic housing 454. In the preferred embodiment, a portion 458 of the housing 454 is thickened to act as a magnifying lens to facilitate viewing of the dial indicator 450. To accomplish the rotation of the dial 450, the upper end 466 of the rod 440 is formed with a laterally projecting dial driving pin 470 which rides within a spiral groove 474 that is cut in an internal sidewall of a bore 478 formed within the rotary dial indicator 450. It is therefore to be understood that as the upper end 466 of the rod 440 moves vertically, that the driving pin 470 also moves vertically within the spiral groove 474 of the rotary dial indicator 450. The upward (or downward) movement of the driving pin 470 within the spiral groove 474 will therefore cause the rotary dial indicator to rotate, as will be understood by those skilled in the art.

A significant difference between the gauge 400 and the gauge 200 is that the rod 440 is physically engaged to the piston 412, just as the push rod 124 is physically engaged to the piston 80 of the rotary dial gauge 10 depicted in FIG. 1 and described hereabove. Thus, the upward and downward movement of the piston 412 is mechanically coupled to the rotary dial 450, such that the dial 450 returns to a zero reading when the air pressure within the bore 408 is released.

As with the previously described gauge embodiments of the present invention, the gauge 400 is calibrated during manufacturing. Specifically, because each coil spring within each gauge 400 has a differing spring constant, each gauge 400 during manufacture is calibrated against a known pressure level and the calibration nut 420 is rotated in its threaded engagement within the piston 412, such that the indicator 450 accurately reflects the test pressure level. Thereafter, the calibration nut is permanently engaged in position to the piston utilizing an engagement means such as soldering.

Upon reading the specification and drawings provided hereabove, it is to be understood that a significant feature of all of the embodiments described hereinabove is the utilization of the calibration nut in its threaded engagement with the piston to provide a means for calibrating the various gauges. Such a calibration is necessary due to the varying spring constants of the differing coil springs that are utilized in the assembled gauges. The fixed engagement of the calibration nut to the piston following the calibration step assures that the gauge will remain calibrated after it has been manufactured.

While the invention has been disclosed and described with regard to specific preferred embodiments, it is intended by the inventor that the following claims cover not only the specific embodiments described herein but other and further altered devices that would occur to those skilled in the art upon reviewing the specification and drawings provided herein. It is therefore intended that the following claims cover all such alterations and modifications which nevertheless include the true spirit and scope of the this invention.

What I claim is:

1. A pressure gauge for operative engagement with a fluid pressurized system, comprising:

a housing having an engagement means for the operative engagement of said gauge with said fluid pressurized system;

a pressurized fluid inlet orifice being formed in said housing for inletting pressurized fluid into said housing;

a cylindrical bore being formed within said housing;

a piston being slidably engaged within said cylindrical bore such that varying fluid pressure will cause slidable motion of said piston within said cylindrical bore;

an arm member being disposed proximate said piston, whereby movement of said piston will cause movement of said arm member;

a resistance means being disposed within said cylinder to provide a resistive force to said movement of said piston;

a calibration means being operative in association with said resistance means to apply a selectable calibration force to said piston, when said calibration means is placed in a selectable position;

a calibration means engagement means being engaged to said calibration means and functioning to fixedly engage said calibration means in said selectable position;

a pressure indicator means being engaged to said arm and functioning to provide an indication of the pressure level of said fluid.

2. A pressure gauge as described in claim 1 wherein said resistance means comprises a coil spring, and wherein said coil spring is disposed between said piston and an end face of said housing.

3. A pressure gauge as described in claim 1 wherein said calibration means is engaged to said piston.

4. A device as described in claim 3 wherein said calibration means is threadably engaged to said piston.

5. A pressure gauge as described in claim 4 where said calibration means isfixedly engaged to said piston by soldering said calibration means to said piston.

6. A pressure gauge as described in claim 1 wherein said pressure indication means includes a round gauge face.

7. A pressure gauge as described in claim 1 wherein said arm member is fixedly engaged to said piston.

8. A pressure gauge as described in claim 1 wherein said arm member is pushed by said piston on the pressurized movement of said piston, but detached from said piston when said pressure is released in said chamber and said piston returns to a nominal position.

9. A pressure gauge as described in claim 1 wherein said pressurized fluid inlet orifice includes a releasable valve means, operative to inlet pressurized fluid into said chamber and hold said pressurized fluid within said chamber until said valve is released by said user.

10. A pressure gauge as described in claim 1 wherein said calibration means engagement means is solder.

* * * * *